United States Patent
Yang

(10) Patent No.: US 12,401,045 B2
(45) Date of Patent: Aug. 26, 2025

(54) COMPOSITE CURRENT COLLECTOR, ELECTRODE PLATE AND ELECTROCHEMICAL DEVICE

(71) Applicant: Ningde Amperex Technology Limited, Ningde (CN)

(72) Inventor: Xiaobing Yang, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 641 days.

(21) Appl. No.: 17/410,116

(22) Filed: Aug. 24, 2021

(65) Prior Publication Data

US 2022/0093931 A1 Mar. 24, 2022

Related U.S. Application Data

(63) Continuation of application No. PCT/CN2020/117219, filed on Sep. 23, 2020.

(51) Int. Cl.
*H01M 4/66* (2006.01)

(52) U.S. Cl.
CPC ........... *H01M 4/665* (2013.01); *H01M 4/661* (2013.01); *H01M 4/668* (2013.01)

(58) Field of Classification Search
CPC ...... H01M 4/665; H01M 4/661; H01M 4/668; H01M 4/667
USPC ........................................................ 429/209
See application file for complete search history.

(56) References Cited

U.S. PATENT DOCUMENTS

| | | | |
|---|---|---|---|
| 2006/0019168 A1* | 1/2006 | Li | H01M 4/664 429/188 |
| 2012/0208082 A1* | 8/2012 | Honda | H01M 4/667 429/210 |
| 2013/0011742 A1* | 1/2013 | Park | H01M 4/667 429/234 |

(Continued)

FOREIGN PATENT DOCUMENTS

| | | | |
|---|---|---|---|
| CN | 105186006 A | * | 12/2015 |
| CN | 107221676 A | | 9/2017 |

(Continued)

OTHER PUBLICATIONS

Office Action issued on Jan. 20, 2023, in corresponding Chinese Application No. 202080005428.9, 12 pages.

(Continued)

*Primary Examiner* — Nicholas A Smith
*Assistant Examiner* — Kevin Nguyen
(74) *Attorney, Agent, or Firm* — Maier & Maier, PLLC

(57) ABSTRACT

A composite current collector includes a base body, a first connecting layer and a first conductive layer, the first connecting layer bonds the first conductive layer to a first surface of the base body; a first passivation layer is formed on one surface of the first conductive layer facing toward the first connecting layer. the first passivation layer may prevent an electrolyte from contacting the first conductive layer and causing the first conductive layer to be corroded and damaged when the electrolyte enters from one surface of the first connecting layer facing away from the first conductive layer, thereby improving the stability of the current collector; an electrode plate and an electrochemical device are provide.

11 Claims, 2 Drawing Sheets

(56) References Cited

U.S. PATENT DOCUMENTS

| | | | | |
|---|---|---|---|---|
| 2015/0340732 | A1* | 11/2015 | Kim | H01M 4/366 429/246 |
| 2018/0316020 | A1* | 11/2018 | Pfleging | H01M 10/0525 |
| 2019/0173093 | A1* | 6/2019 | Liang | H01M 4/0404 |

FOREIGN PATENT DOCUMENTS

| | | | | |
|---|---|---|---|---|
| CN | 206849946 | U | * 1/2018 | |
| CN | 107768673 | A | 3/2018 | |
| CN | 207353383 | U | 5/2018 | |
| CN | 108417841 | A | * 8/2018 | H01M 4/667 |
| CN | 109873165 | A | 6/2019 | |
| CN | 110247056 | A | 9/2019 | |
| CN | 110943227 | A | 3/2020 | |
| CN | 211088397 | U | 7/2020 | |
| CN | 111816883 | A | * 10/2020 | H01M 10/0525 |
| EP | 2503628 | A1 | 9/2012 | |
| EP | 3389122 | A1 | 10/2018 | |
| EP | 3496190 | A1 | 6/2019 | |
| EP | 3547425 | A1 | 10/2019 | |
| JP | H0676827 | A | 3/1994 | |
| JP | H0973905 | A | 3/1997 | |
| JP | H11102711 | A | 4/1999 | |
| JP | 2001216956 | A | 8/2001 | |
| JP | 2010118164 | A | 5/2010 | |
| JP | 2010277862 | A | 12/2010 | |
| JP | 2014235912 | A | 12/2014 | |
| JP | 2016535920 | A | 11/2016 | |
| JP | 2018181796 | A | 11/2018 | |
| JP | 2019102427 | A | 6/2019 | |
| JP | 2019186204 | A | 10/2019 | |
| KR | 1020120069772 | A | 6/2012 | |
| KR | 1020160036998 | A | 4/2016 | |
| WO | 2011090044 | A1 | 7/2011 | |
| WO | 2013172007 | A1 | 11/2013 | |
| WO | 2017138382 | A1 | 8/2017 | |

OTHER PUBLICATIONS

Office Action issued on Jun. 2, 2023, in corresponding Chinese Application No. 202080005428.9, 16 pages.

Office Action issued on Jan. 17, 2023, in corresponding Japanese Application No. 2021-516757, 8 pages.

Office Action issued on Aug. 1, 2023, in corresponding Japanese Application No. 2021-516757, 6 pages.

Request for the Submission of an Opinion issued on Mar. 29, 2023, in corresponding Korean Application No. 10-2021-7009039, 13 pages.

International Search Report and Written Opinion of the International Searching Authority issued on Jun. 21, 2021 in corresponding International application No. PCT/CN2020/117219; 9 pages.

Written Decision on Registration issued on Oct. 18, 2023, in corresponding Korean Application No. 10-2021-7009039, 4 pages.

Extended Search Report issued on May 13, 2025, in corresponding European Application No. 20866942.4, 7 pages.

* cited by examiner

COMPOSITE CURRENT COLLECTOR, ELECTRODE PLATE AND ELECTROCHEMICAL DEVICE

CROSS REFERENCE TO RELATED APPLICATION

This application is a continuation application of the PCT international application Serial No. PCT/CN2020/117219, filed on Sep. 23, 2020, and the entire content of which is incorporated herein by reference.

TECHNICAL FIELD

The application relates to a composite current collector, an electrode plate and an electrochemical device.

BACKGROUND

Electrochemical devices can be charged and discharged, and have been widely used in the fields such as consumer products, digital products, power products, medical treatment and security. Current collector is the carrier of an active material in an electrochemical device, is an important part of the electrochemical device, and is closely related to the energy density of the electrochemical device. In the existing process for manufacturing a current collector, a metal polymer film is generally first obtained by metal physical vapor deposition on the surface of a low-density polymer film. In order to make the current collector have better electrical conductivity, it is necessary to deposit a larger thickness of the metal layer on the polymer film, but the increase in the thickness of the current collector will reduce the energy density of the electrochemical device, and the current collector produced in such way is poor in resisting against the corrosion of electrolyte, and the metal layer is likely to fall off during a long-term operation of the electrochemical device and result in failure.

SUMMARY

The application is intended to solve at least one of the technical problems in the prior art. In view of this, one aspect of the application is to provide a composite current collector, a passivation layer is formed on one surface of a conductive layer facing toward a connecting layer, the passivation layer may prevent an electrolyte from contacting the conductive layer and causing the conductive layer to be corroded and damaged when the electrolyte enters from one surface of the connecting layer facing away from the conductive layer, thereby improving the stability of the current collector.

A composite current provided by one embodiment of the application, comprises a base body, a first connecting layer and a first conductive layer, the first connecting layer being used for bonding the first conductive layer to a first surface of the base body, and a first passivation layer being formed on one surface of the first conductive layer facing toward the first connecting layer.

In some embodiments, the composite current collector further comprises a second connecting layer and a second conductive layer; the second connecting layer is used for bonding the second conductive layer to a second surface of the base body, and a second passivation layer is formed on one surface of the second conductive layer facing toward the second connecting layer.

In some embodiments, a thickness of the base body is in the range of from 2 μm to 36 μm, a thickness of the first connecting layer is in the range of from 0.2 μm to 2 μm, a thickness of the first conductive layer is in the range of from 100 nm to 5000 nm, and a thickness of the passivation layer is in the range of from 5 nm to 200 nm.

In some embodiments, the base body is at least one selected from the group consisting of a polyethylene film, a polypropylene film, a polyethylene terephthalate film, a polyethylene naphthalate film, a poly(p-phenylene terephthamide) film, a polyimide film, a polycarbonate film, a polyetheretherketone film, a polyoxymethylene film, a poly(p-phenylene sulfide) film, a poly(p-phenylene ether) film, a polyvinyl chloride film, a polyamide film and a polytetrafluoroethylene film.

In some embodiments, the first connecting layer is at least one selected from the group consisting of polyurethane, epoxy resin, polyacrylate, polyvinyl acetate, unsaturated polyester, phenolic resin, urea-formaldehyde resin, modified polyolefin resin, silicone resin, ethylene-acrylic acid copolymer, an ethylene-vinyl acetate copolymer, an ethylene-vinyl alcohol copolymer and polyamide.

In some embodiments, the first passivation layer is at least one selected from the group consisting of an aluminum oxide layer, a titanium oxide layer, a zirconium oxide layer, an aluminum nitride layer, a titanium nitride layer, a titanium carbide layer, a zirconium carbide layer, a silicon dioxide layer, a silicon nitride layer, a silicon carbide layer and an aluminum chromate layer.

In some embodiments, the first conductive layer is at least one selected from the group consisting of aluminum, copper, nickel, iron, titanium, silver, gold, cobalt, chromium, molybdenum and tungsten.

In some embodiments, the first surface of the base body is provided with a groove pattern, and the connecting layer is also filled in the groove pattern.

In some embodiments, the groove pattern is composed of one or more porous structures.

In some embodiments, at least one of the porous structures penetrates through the base body or at least one of the porous structures does not penetrate through the base body.

Another aspect of the application is to provide an electrode plate, comprising a composite current collector and an active material layer. The composite current collector comprises a base body, a first connecting layer and a first conductive layer, the first connecting layer being used for bonding the first conductive layer to a first surface of the base body, and a first passivation layer being formed on one surface of the first conductive layer facing toward the first connecting layer. The active material layer is formed on one surface of the first conductive layer facing away from the base body of the composite current collector.

Another aspect of the application is to provide an electrochemical device, comprising an electrode plate. The electrode plate comprises a composite current collector and an active material layer. The composite current collector comprises a base body, a first connecting layer and a first conductive layer, the first connecting layer being used for bonding the first conductive layer to a first surface of the base body, and a first passivation layer being formed on one surface of the first conductive layer facing toward first connecting layer. The active material layer is formed on one surface of the first conductive layer facing away from the base body of the composite current collector.

In the composite current collector according to the present embodiment of the application, a passivation layer is formed on one surface of a conductive layer facing toward a connecting layer, the passivation layer may prevent an electrolyte from contacting the conductive layer and causing the conductive layer to be corroded and damaged when the electrolyte enters from one surface of the connecting layer facing away from the conductive layer, and thereby improving the stability of the current collector.

BRIEF DESCRIPTION OF DRAWINGS

The aspects and advantages mentioned above and/or attached would be clear and easy to understand through the description of embodiments combining the following drawings, wherein.

DESCRIPTION OF REFERENCE SIGNS OF MAIN ELEMENTS

Figure 1:
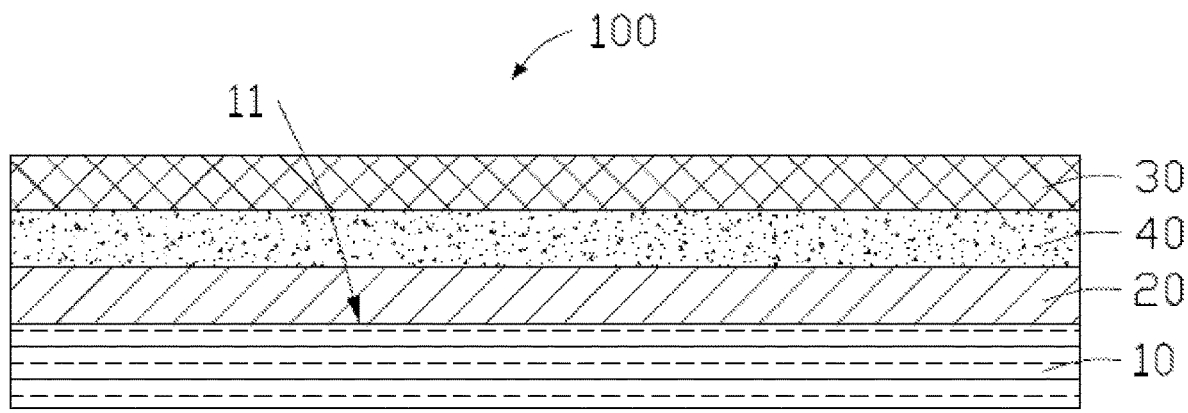
FIG. 1 is a structure diagram of a composite current collector according to one embodiment of the application.

Base body 10, First surface 11, Second surface 12, First connecting layer 20, First conductive layer 30, First passivation layer 40, Second connecting layer 50, Second conductive layer 60, Second passivation layer 70, Groove pattern 80, Porous structure 81.

DETAILED DESCRIPTION OF EMBODIMENTS

The embodiments of the application are described below and examples of said embodiments are shown in the drawings, in which the same or similar reference signs always indicate same or similar elements, or elements with same or similar functions. The exemplary embodiment described by the following figures is to explain the application, but not a limit of the application.

Figure 2:
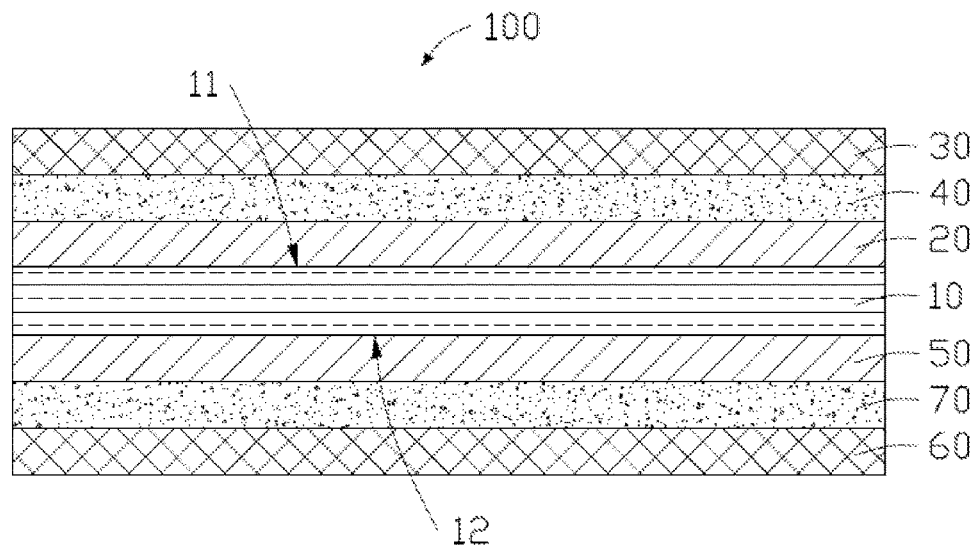
FIG. 2 is a structure diagram of a composite current collector according to another embodiment of the application.
Figure 3:
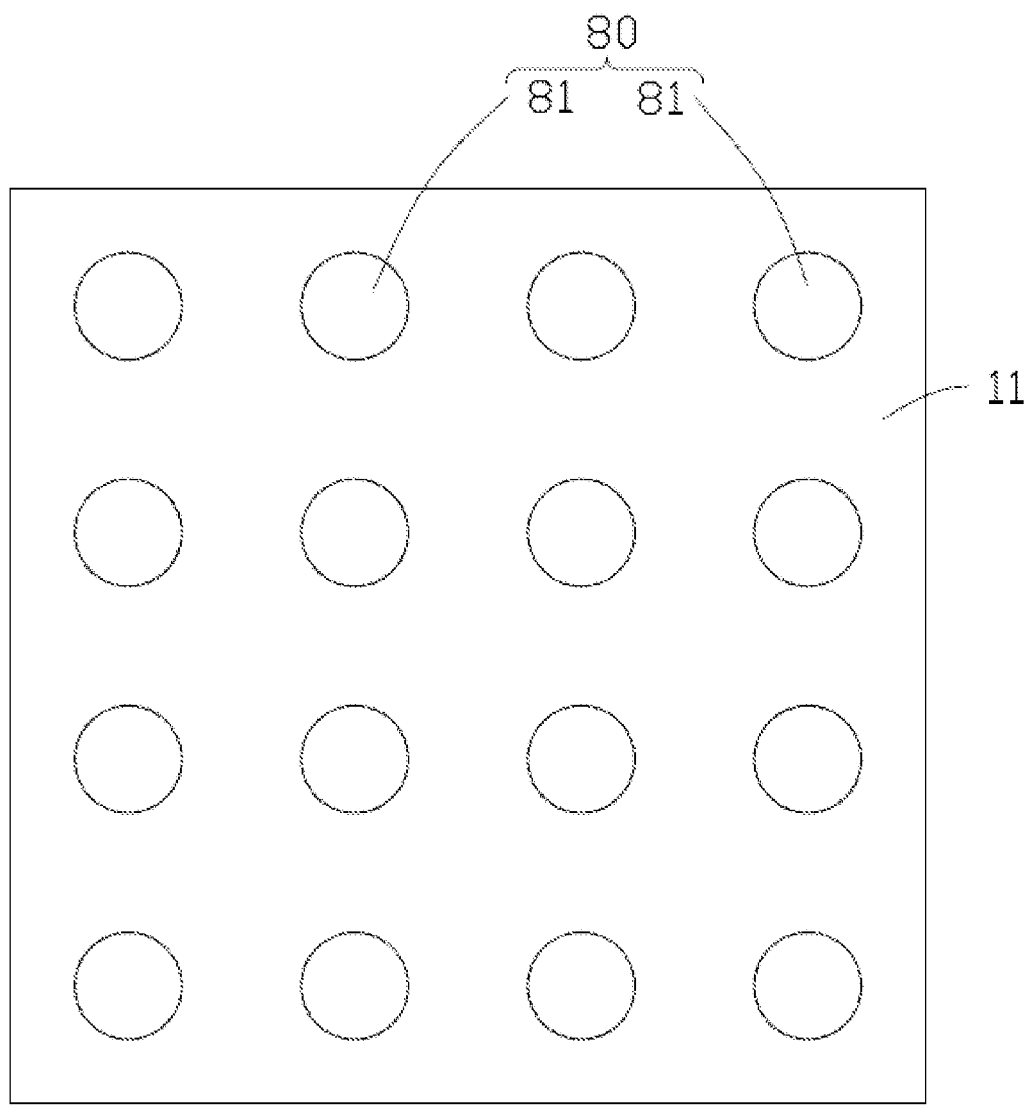
FIG. 3 is a structure diagram of a groove pattern formed in a surface of a base body according to one embodiment of the application.

Referring to FIG. 1 to FIG. 3, the composite current collector 100 is described according to the embodiments of the application.

As shown in FIG. 1, the current collector 100 according to the embodiments of the application comprises a base body 10, a first connecting layer 20, a first conductive layer 30 and a first passivation layer 40. The first connecting layer 20 is located between the base body 10 and the first conductive layer 30, and the first passivation layer 40 is formed on one surface of the first conductive layer 30 facing toward the first connecting layer 20. One surface of the first connecting layer 20 is bonded to a first surface 11 of the base body 10, and another surface of the first connecting layer 20 is bonded to the first passivation layer 40, so that the first connecting layer 20 is capable of bonding the first conductive layer 30 to a first surface 11 of the base body 10.

For example, the first passivation layer 40 may be closely attached to the surface of the first conductive layer 30 by means of chemical reaction or vapor deposition.

As shown in FIG. 2, the composite current collector 100 further comprises a second connecting layer 50, a second conductive layer 60 and a second passivation layer 70. The second connecting layer 50 is located between the base body 10 and the second conductive layer 60, and the second passivation layer 70 is formed in one surface of the second conductive layer 60 facing toward the second connecting layer 50. One surface of the second connecting layer 50 is bonded to the second surface 11 of the base body 10, and another surface of the second connecting layer 50 is bonded to the second passivation layer 70, so that the second connecting layer 50 is capable of bonding the second conductive layer 60 to a second surface 12 of the base 10.

For example, the second passivation layer 70 may be closely attached to the surface of the second conductive layer 60 by means of chemical reaction or vapor deposition.

In some embodiments, the first conductive layer 30 and the second conductive layer 60 can be made by a physical vapor deposition process, which can be selected from any one of magnetron sputtering, crucible boat evaporation coating, and electron beam evaporation coating. The first conductive layer 30 and the second conductive layer 60 can respectively form a first passivation layer 40 and a second passivation layer 70 on the surfaces thereof by means of processing processes such as electron beam evaporation, DC magnetron sputtering, radio frequency magnetron sputtering, surface oxidation, chemical deposition and spraying. The first passivation layer 40 can be used to prevent the electrolyte from contacting the first conductive layer 30 and causing the first conductive layer 30 to be corroded and damaged when the electrolyte enters from one surface of the first connecting layer 20 facing away from the first conductive layer 30. The passivation layer 70 can be used to prevent the electrolyte from contacting the second conductive layer 60 and causing the second conductive layer 60 to be corroded and damaged when the electrolyte enters from one surface of the second connection layer 50 facing away from the second conductive layer 60, thereby improving the stability of the composite current collector 100.

In some embodiments, the base body 10 may be at least one selected from the group consisting of a polyethylene film, a polypropylene film, a polyethylene terephthalate film, a polyethylene naphthalate film, a poly(p-phenylene terephthamide) film, a polyimide film, a polycarbonate film, a polyetheretherketone film, a polyoxymethylene film, a poly(p-phenylene sulfide) film, a poly(p-phenylene ether) film, a polyvinyl chloride film, a polyamide film and a polytetrafluoroethylene film. The thickness of the base body 10 may be in the range of from 2 μm to 36 μm.

In some embodiments, the first connecting layer 20 and the second connecting layer 50 may be at least one respectively selected from the group consisting of polyurethane, epoxy resin, polyacrylate, polyvinyl acetate, unsaturated polyester, phenolic resin, urea-formaldehyde resin, modified polyolefin resin, silicone resin, an ethylene-acrylic acid copolymer, an ethylene-vinyl acetate copolymer, an ethylene-vinyl alcohol copolymer and polyamide. The thickness of the first connecting layer 20 and the second connecting layer 50 may both be in the range of from 0.2 μm to 2 μm.

In some embodiments, the materials of the first conductive layer 30 and the second conductive layer 60 may be at least one selected from the group consisting of aluminum, copper, nickel, iron, titanium, silver, gold, cobalt, chromium, molybdenum and tungsten. The thickness of the first conductive layer 30 and the second conductive layer 60 may both be in the range of from 100 nm to 5000 nm.

In some embodiments, the first passivation layer 40 and the second passivation layer 70 may be at least one respectively selected from the group consisting of an aluminum oxide layer, a titanium oxide layer, a zirconium oxide layer, an aluminum nitride layer, a titanium nitride layer, a titanium carbide layer, a zirconium carbide layer, a silicon dioxide layer, a silicon nitride layer, a silicon carbide layer and an aluminum chromate layer. The thickness of the first passivation layer 40 and the second passivation layer 70 may both be in the range of from 5 nm to 200 nm. In other embodiments, the first passivation layer 40 may also be formed by coating a passivation liquid on one surface of the first conductive layer 30 facing toward the first connection layer 20, and the second passivation layer 70 may also be formed by coating a passivation liquid on one surface of the second conductive layer 60 facing toward the second connecting layer 50. The passivation liquid may refer to a solution capable of passivating a metal surface. The passivation liquid may form a surface state capable of preventing metal from reacting normally on the metal surface, so as to improve the corrosion resistance thereof.

In the composite current collector 100 according to the present embodiment of the application, a passivation layer is formed on one surface of a conductive layer facing toward a connecting layer, which may prevent an electrolyte from contacting the conductive layer and causing the conductive layer to be corroded and damaged when the electrolyte enters from one surface of the connecting layer facing away from the conductive layer, thereby improving the stability of the current collector.

As shown in FIG. 3, the first surface 11 of the base body 10 is provided with a groove pattern 80, and the first connecting layer 20 can also be filled in the groove pattern 80, thereby improving the adhesion between the first connecting layer 20 and the base body 10, so that the first conductive layer 30 is not easy to fall off from the base body 10, thereby further improving the stability of the current collector.

In some embodiments, the first surface 11 of the base body 10 may be subject to patterning treatments such as hole formation and carving to form the groove pattern 80. For example, the groove pattern 80 is formed on the first surface 11 by processing methods such as laser drilling, nuclear track etching, chemical etching and photochemical etching.

In some embodiments, the groove pattern 80 may be composed of one or more porous structures 81, and these porous structures may be set to penetrate through the base body 10 or not to penetrate through the base body 10 according to actual needs. For example, the plurality of porous structures 81 all penetrate through the base body 10, none of the plurality of porous structures 81 penetrate through the base body 10, or some of the plurality of porous structures 81 penetrate through the base body 10, and the other part of the porous structures do not penetrate through the base body 10.

In some embodiments, the shape of the porous structure 81 may be set according to actual requirements. For example, the porous structure 81 shown in FIG. 3 is a circular pore. The porous structure 81 may also be a triangular hole, a quadrilateral hole, a polygonal hole, an irregular shape hole, and the like.

In some embodiments, a second surface 12 of the base body 10 may also be provided with a groove pattern 80, and the second connecting layer 50 is filled in the groove pattern 80, thereby improving the adhesion between the second connecting layer 50 and the base body 10, so that the second conductive layer 60 is not easy to fall off from the base body 10.

In addition, an electrode plate is also disclosed by the application, comprising the composite current collector 100 in any of the cases above.

In some embodiments, one surface of the first conductive layer 30 facing away from the first connecting layer 20 is provided with an active material layer, and one surface of the second conductive layer 60 facing away from the second connecting layer 50 is also provided with the active material layer. Under the condition that the composite current collector 100 is a cathode current collector, the active material layer is a cathode active material coating. Under the condition that the composite current collector 100 is an anode current collector, the active material layer is an anode active material coating.

In addition, an electrochemical device is also disclosed by the application, comprising an electrode plate in any of the cases above. The electrochemical device may be a lithium ion battery, a lithium polymer battery, or the like.

The following Contrast Examples 1 to 3 are all composite current collectors without a passivation layer.

Contrast Example 1

Place a polyimide film with a thickness of 50 μm in a vacuum chamber of a crucible boat type vacuum evaporation aluminum plating machine; seal the vacuum chamber and pump the pressure of the vacuum aluminum plating machine to $10^{-3}$ Pa; wait until the temperature of a crucible boat is adjusted to 1200 to 1500° C.; start plating with aluminum; and stop the plating with aluminum after the aluminum degree reaches 200 nm. Carry out corona treatment on a polyethylene terephthalate film with a thickness of 12 μm, and coat the surface thereof with a mixture of bisphenol A epoxy resin and amine curing agent; and in the open time of the coating, carry out hot pressing and compounding on aluminum-plated surfaces of a polyethylene terephthalate film and a polyimide film which are previously treated (the temperature of the hot pressing and compounding is 85° C. and the pressure is 0.7 Mpa) to obtain a first contrast composite current collector.

Contrast Example 2

Place a polyimide film with a thickness of 50 μm in a vacuum chamber of a crucible boat type vacuum evaporation aluminum plating machine; seal the vacuum chamber and pump the pressure of the vacuum aluminum plating machine to $10^{-3}$ Pa; wait until the temperature of a crucible boat is adjusted to 1200-1500° C.; start plating with aluminum; and stop the plating with aluminum after the aluminum degree reaches 500 nm. Carry out corona treatment on a polyethylene terephthalate film with a thickness of 12 μm, and coat the surface thereof with a mixture of bisphenol A epoxy resin and amine curing agent; and in the open time of the coating, carry out hot pressing and compounding on aluminum-plated surfaces of a polyethylene terephthalate film and a polyimide film which are previously treated (the temperature of the hot pressing and compounding is 85° C. and the pressure is 0.7 Mpa) to obtain a second contrast composite current collector.

Contrast Example 3

Place a polyimide film with a thickness of 50 μm in a vacuum chamber of a crucible boat type vacuum evaporation aluminum plating machine; seal the vacuum chamber and pump the pressure of the vacuum aluminum plating machine to $10^{-3}$ Pa; wait until the temperature of a crucible boat is adjusted to 1200-1500° C.; start plating with aluminum; and stop the plating with aluminum after the aluminum degree reaches 500 nm. Carry out corona treatment on polyethylene terephthalate film with a thickness of 12 μm, and coat the surface thereof with a single-component polyurethane adhesive; and in the open time of the coating, carry out hot pressing and compounding on aluminum-plated surfaces of a polyethylene terephthalate film and a polyimide film which are previously treated (the temperature of the hot pressing and compounding is 85° C. and the pressure is 0.7 Mpa) to obtain a third contrast composite current collector.

The specific embodiments 1 to 6 described below adopt the composite current collector comprising the passivation layer in the embodiments of the invention.

Embodiment 1

Place a polyimide film with a thickness of 50 μm in a vacuum chamber of a crucible boat type vacuum evaporation aluminum plating machine; seal the vacuum chamber and pump the pressure of the vacuum aluminum plating machine to $10^{-3}$ Pa; wait until the temperature of a crucible boat is adjusted to 1200-1500° C.; start plating with aluminum; stop the plating with aluminum after the aluminum degree reaches 200 nm; and then sputtering an $Al_2O_3$ passivation layer with a thickness of 5 nm on the surface of the aluminum layer for use. Carry out corona treatment on a polyethylene terephthalate film with a thickness of 12 μm, and coat the surface thereof with a mixture of bisphenol A epoxy resin and amine curing agent; and in the open time of the coating, carry out hot pressing and compounding on passivated surfaces of aluminum-plated layers of a polyethylene terephthalate film and a polyimide film which are previously treated (the temperature of the hot pressing and compounding is 85° C. and the pressure is 0.7 Mpa) to obtain a first composite current collector.

Embodiment 2

Place a polyimide film with a thickness of 50 μm in a vacuum chamber of a crucible boat type vacuum evaporation aluminum plating machine; seal the vacuum chamber and pump the pressure of the vacuum aluminum plating machine to $10^{-3}$ Pa; wait until the temperature of a crucible boat is adjusted to 1200-1500° C.; start plating with aluminum; stop the plating with aluminum after the aluminum degree reaches 500 nm; and then sputtering an $Al_2O_3$ passivation layer with a thickness of 10 nm on the surface of the aluminum layer for use. Carry out corona treatment on a polyethylene terephthalate film with a thickness of 12 μm, and coat the surface thereof with a mixture of bisphenol A epoxy resin and amine curing agent; and in the open time of the coating, carry out hot pressing and compounding on passivated surfaces of aluminum-plated layers of a polyethylene terephthalate film and a polyimide film which are previously treated (the temperature of the hot pressing and compounding is 85° C. and the pressure is 0.7 Mpa) to obtain a second composite current collector.

Embodiment 3

Place a polyimide film with a thickness of 50 μm in a vacuum chamber of a crucible boat type vacuum evaporation aluminum plating machine; seal the vacuum chamber and pump the pressure of the vacuum aluminum plating machine to $10^{-3}$ Pa; wait until the temperature of a crucible boat is adjusted to 1200-1500° C.; start plating with aluminum; stop the plating with aluminum after the aluminum degree reaches 500 nm; and then sputtering an $Al_2O_3$ passivation layer with a thickness of 20 nm on the surface of the aluminum layer for use. Carry out corona treatment on a polyethylene terephthalate film with a thickness of 12 μm, and coat the surface thereof with a mixture of bisphenol A epoxy resin and amine curing agent; and in the open time of the coating, carry out hot pressing and compounding on passivated surfaces of aluminum-plated layers of a polyethylene terephthalate film and a polyimide film which are previously treated (the temperature of the hot pressing and compounding is 85° C. and the pressure is 0.7 Mpa) to obtain a third composite current collector.

Embodiment 4

Place a polyimide film with a thickness of 50 μm in a vacuum chamber of a crucible boat type vacuum evaporation aluminum plating machine; seal the vacuum chamber and pump the pressure of the vacuum aluminum plating machine to $10^{-3}$ Pa; wait until the temperature of a crucible boat is adjusted to 1200-1500° C.; start plating with aluminum; stop the plating with aluminum after the aluminum degree reaches 500 nm; and then sputtering an $Al_2O_3$ passivation layer with a thickness of 20 nm on the surface of the aluminum layer for use. Carry out corona treatment on a polyethylene terephthalate film with a thickness of 12 μm, and coat the surface thereof with a single-component polyurethane adhesive; and in the open time of the coating, carry out hot pressing and compounding on passivated surfaces of aluminum-plated layers of a polyethylene terephthalate film and a polyimide film which are previously treated (the temperature of the hot pressing and compounding is 85° C. and the pressure is 0.7 Mpa) to obtain a fourth contrast composite current collector.

Embodiment 5

Place a polyimide film with a thickness of 50 μm in a vacuum chamber of a crucible boat type vacuum evaporation aluminum plating machine; seal the vacuum chamber and pump the pressure of the vacuum aluminum plating machine to $10^{-3}$ Pa; wait until the temperature of a crucible boat is adjusted to 1200-1500° C.; start plating with aluminum; stop the plating with aluminum after the aluminum degree reaches 500 nm; and then sputtering a $TiO_2$ passivation layer with a thickness of 20 nm on the surface of the aluminum layer for use. Carry out corona treatment on a polyethylene terephthalate film with a thickness of 12 μm, and coat the surface thereof with a single-component polyurethane adhesive; and in the open time of the coating, carry out hot pressing and compounding on passivated surfaces of aluminum-plated layers of a polyethylene terephthalate film and a polyimide film which are previously treated (the temperature of the hot pressing and compounding is 85° C. and the pressure is 0.7 Mpa) to obtain a fifth contrast composite current collector.

Embodiment 6

Place a polyimide film with a thickness of 50 μm in a vacuum chamber of a crucible boat type vacuum evaporation aluminum plating machine; seal the vacuum chamber and pump the pressure of the vacuum aluminum plating machine to $10^{-3}$ Pa; wait until the temperature of a crucible boat is adjusted to 1200-1500° C.; start plating with aluminum; stop the plating with aluminum after the aluminum degree reaches 500 nm; and then coating with a coating liquid containing $Cr^{3+}$ to form an aluminum chromate passivation layer with a thickness of 200 nm for use. Carry out corona treatment on a polyethylene terephthalate film with a thickness of 12 μm, and coat the surface thereof with a single-component polyurethane adhesive; and within the open time of the coating, carry out hot pressing and compounding on passivated surfaces of aluminum-plated layers of a polyethylene terephthalate film and a polyimide film which are previously treated (the temperature of the hot pressing and compounding is 85° C. and the pressure is 0.7 Mpa) to obtain a sixth contrast composite current collector.

In some embodiments, an immersion experiment is performed on the composite current collectors obtained in Embodiments 1 to 6 and Contrast Examples 1 to 3. The implementation process may be: cut each composite current collector into current collector splines with a length of 5 cm and a width of 2 cm; immerse the same in an electrolyte and encapsulate with an aluminum plastic film to remove external environmental interference; and finally, place the splines in a constant temperature drying oven at 85° C. for 72 hours and then take the same out to observe the appearance of each composite current collector. The observation results of the composite current collectors in Embodiments 1 to 6 and Contrast Examples 1 to 3 are compiled in Table 1 below.

TABLE 1

| | Sample name | Electrolyte soaking result |
|---|---|---|
| Embodiments | | |
| 1 | First composite current collector | No fall off of aluminum layer |
| 2 | Second composite current collector | No fall off of aluminum layer |
| 3 | Third composite current collector | No fall off of aluminum layer |
| 4 | Fourth composite current collector | No fall off of aluminum layer |
| 5 | Fifth composite current collector | No fall off of aluminum layer |
| 6 | Sixth composite current collector | No fall off of aluminum layer |
| Contrast Example | | |
| 1 | First contrast composite currentcollector | Orange peel-shaped pattern of aluminum layer |
| 2 | Second contrast composite current collector | Orange peel-shaped pattern of aluminum layer |
| 3 | Third contrast composite current collector | Fall off of aluminum layer in pieces |

According to Table 1, the tolerance of the electrolyte of the composite current collector in Embodiments 1-6 is superior to that in Contrast examples 1-3, which indicates that the passivation layer formed on an inner surface of a conductive layer may prevent the electrolyte from contacting the conductive layer and causing the conductive layer to be corroded and damaged when the electrolyte enters from one surface of the connecting layer facing away from the conductive layer, thereby improving the stability of the composite current collector.

In the description of the application, it should be noted that, the direction or position relations indicated by the terms "center", "longitudinal", "transverse", "length", "width", "thickness", "upper", "lower", "front", "rear", "left", "right", "vertical", "horizontal", "top", "bottom", "inner", "outer", "clockwise", "anti-clockwise", "axial", "radial", "circumferential", etc. are the direction or position relations based on the drawings, only to facilitate description of the application and simplified description, but not to indicate or imply that the indicated device or element must have a special direction, be made or operated in a special direction, thus it cannot be understood as the restriction to the application. In the description of the application, the meaning of "multiple" is two or more.

In the specification of the Description, the reference terms "one embodiment", "some embodiments", "schematic embodiments", "example", "specific example", or "some examples", etc. are described to refer to the specific features, structures, materials or characteristics described in combination with this embodiment or example being included in at least one embodiment or example of the application. In the Description, the illustrative expressions of the above terms do not necessarily refer to the same embodiment or example. Moreover, the specific features, structures, materials or characteristics described may be appropriately combined in any one or more embodiments or examples.

Although the embodiments of the application have been shown and described, those of ordinary skill in the art can understand that: without departing from the principles and the tenet of the application, various changes, modifications, replacements and deformations may be made to these embodiments.

What is claimed is:

1. A composite current collector, comprising:
   a base body,
   a first connecting layer and a first conductive layer; wherein the first connecting layer bonds the first conductive layer to a first surface of the base body; a first passivation layer is formed on one surface of the first conductive layer facing toward the first connecting layer; and
   a second connecting layer and a second conductive layer; wherein the second connecting layer bonds the second conductive layer to a second surface of the base body; a second passivation layer is formed on one surface of the second conductive layer facing toward the second connecting layer;
   wherein the first surface of the base body is provided with a groove pattern, and the first connecting layer is filled in the groove pattern; and
   wherein the groove pattern comprises at least one groove that does not penetrate through the base body and a plurality of openings that penetrate through the base body;
   wherein the base body is at least one selected from the group consisting of a polyethylene film, a polypropylene film, a polyethylene terephthalate film, a polyethylene naphthalate film, a poly(p-phenylene terephthalamide) film, a polyimide film, a polycarbonate film, a polyetheretherketone film, a polyoxymethylene film, a poly(p-phenylene sulfide) film, a poly(p-phenylene ether) film, a polyvinyl chloride film, a polyamide film and a polytetrafluoroethylene film.

2. The composite current collector according to claim 1, wherein a thickness of the base body is in the range of from 2 μm to 36 μm, a thickness of the first connecting layer is in the range of from 0.2 μm to 2 μm, a thickness of the first conductive layer is in the range of from 100 nm to 5000 nm, and a thickness of the passivation layer is in the range of from 5 nm to 200 nm.

3. The composite current collector according to claim 1, wherein the first connecting layer is at least one selected from the group consisting of polyurethane, epoxy resin, polyacrylate, polyvinyl acetate, unsaturated polyester, phenolic resin, urea-formaldehyde resin, modified polyolefin resin, silicone resin, an ethylene-acrylic acid copolymer, an ethylene-vinyl acetate copolymer, an ethylene-vinyl alcohol copolymer and polyamide.

4. The composite current collector according to claim 1, wherein the first passivation layer is at least one selected from the group consisting of a titanium oxide layer, a zirconium oxide layer, an aluminum nitride layer, a titanium nitride layer, a titanium carbide layer, a zirconium carbide layer, a silicon dioxide layer, a silicon nitride layer, a silicon carbide layer and an aluminum chromate layer.

5. The composite current collector according to claim 1, wherein the first conductive layer is at least one selected from the group consisting of aluminum, copper, nickel, iron, titanium, silver, gold, cobalt, chromium, molybdenum and tungsten.

6. An electrochemical device, comprising:
the composite current collector according to claim 1; and
an active material layer formed on one surface of the first conductive layer of the composite current collector facing away from the base body.

7. The electrochemical device according to claim 6, wherein a thickness of the base body is in the range of from 2 μm to 36 μm, a thickness of the first connecting layer is in the range of from 0.2 μm to 2 μm, a thickness of the first conductive layer is in the range of from 100 nm to 5000 nm, and a thickness of the passivation layer is in the range of from 5 nm to 200 nm.

8. The electrochemical device according to claim 6, wherein the first connecting layer is at least one selected from the group consisting of polyurethane, epoxy resin, polyacrylate, polyvinyl acetate, unsaturated polyester, phenolic resin, urea-formaldehyde resin, modified polyolefin resin, silicone resin, an ethylene-acrylic acid copolymer, an ethylene-vinyl acetate copolymer, an ethylene-vinyl alcohol copolymer and polyamide.

9. The electrochemical device according to claim 6, wherein the first passivation layer is at least one selected from the group consisting of a titanium oxide layer, a zirconium oxide layer, an aluminum nitride layer, a titanium nitride layer, a titanium carbide layer, a zirconium carbide layer, a silicon dioxide layer, a silicon nitride layer, a silicon carbide layer and an aluminum chromate layer.

10. The electrochemical device according to claim 6, wherein the first conductive layer is at least one selected from the group consisting of aluminum, copper, nickel, iron, titanium, silver, gold, cobalt, chromium, molybdenum and tungsten.

11. The composite current collector according to claim 1, wherein the first passivation layer comprises an aluminum chromate layer.

* * * * *